J. P. HAIG & A. H. PORTER.
VALVE.
APPLICATION FILED APR. 13, 1908.
966,198.
Patented Aug. 2, 1910.
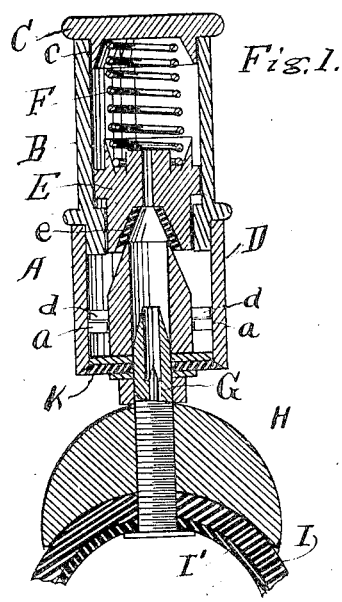
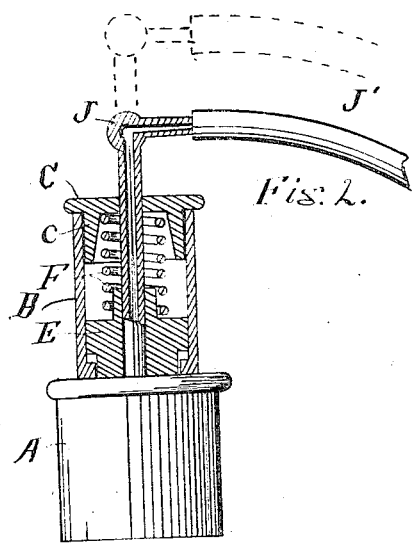
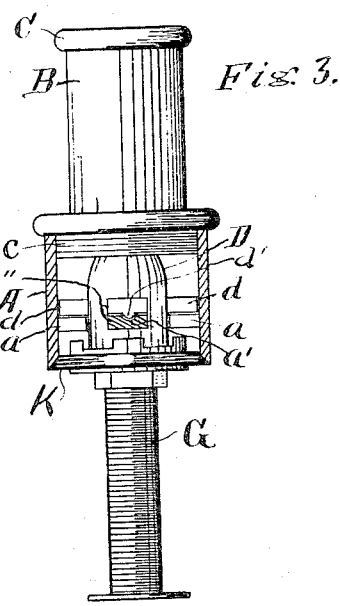
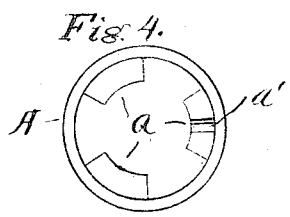
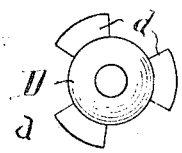
Witnesses
Chas E Blackslee
Fred Lane
Inventors
James P. Haig
Alvin H. Porter

UNITED STATES PATENT OFFICE.

JAMES P. HAIG AND ALVIN H. PORTER, OF GRAND RAPIDS, MICHIGAN.

VALVE.

966,198.

Specification of Letters Patent. Patented Aug. 2, 1910.

Application filed April 13, 1908. Serial No. 426,881.

*To all whom it may concern:*

Be it known that we, JAMES P. HAIG and ALVIN H. PORTER, citizens of the United States, residing at Grand Rapids, in the county of Kent and State of Michigan, have invented certain new and useful Improvements in Valves, of which the following is a specification.

Our invention relates to improvements in valves for use upon automobile wheels in connection with pneumatic tires, and its objects are: first, to provide a valve that may be readily attached to, and detached from an automobile wheel and with which perfectly reliable air tight joints may be readily formed, and, second, to provide a valve that may be used as an air retaining valve, or may be readily converted for use for filling the tire with air. We attain these objects by the mechanism illustrated in the accompanying drawing in which—

Figure 1 is a vertical section of the valve showing its several parts in their relative positions with each other. Fig. 2 is an elevation of the case shown partly in section to illustrate how the air filling appliance is attached and worked. Fig. 3 is the same with the lower portion of the case in section to show the manner of securing the valve and case to an ordinary automobile valve. Fig. 4 is a plan of the lower portion of the case showing the position of the lugs by which the valve case is secured to the automobile valve stem, and Fig. 5 is a like view of the adjustable valve that works inside of the case, and that is secured permanently to the automobile valve stem.

Similar letters refer to similar parts throughout the several views.

In the accompanying drawing H represents the rim of a wheel, I represents the outer casing and I' the inner tube of a pneumatic tire and G represents the valve stem of an ordinary automobile wheel.

Our invention consists of a body portion A that is provided with integral lugs *a a* in position to be easily engaged by similar lugs on the point D, which is firmly attached to the stem G, and this stem carries a soft rubber gasket K that forms an air tight joint with the end of the body A, as indicated in Figs. 1 and 3, while the upper end of the point D forms a like joint in the gasket or packing *e* that is located in the lower end of the valve E, which valve is held firmly upon its seat by the spring F in the upper portion, B, of the body, inclosed by the cap C, the cap C and the lower end of the portion B being screwed into their respective bearings, as shown on Figs. 2 and 3 and indicated in Fig. 1.

To assemble this valve the point D is passed up into the bottom of the body A so that the lugs *d d* on the point will pass between the lugs *a* in the body A and beyond them when the valve is turned round until the lug on the point comes in contact with the stop *a''* on the lugs *a*, see Fig. 3, and the lug *d'* will engage the groove *a'* so that the point cannot be turned too far around and when it has been carried around to place to be held by the lug *a* it will retain its position without danger of being jarred out of position by the motion of the automobile while traveling over rough roads.

Thus far we have confined our description entirely to the valve shown in Fig. 1 which is designed to be placed upon and protect the ordinary tire valve, G, when not forcing air into the tire, but when it is desired to force air into the tire the valve shown in Fig. 1 is removed, by turning it one third of a revolution away from the lug *a''* so that the lugs *d* may be drawn out between the lugs *a* and the valve portion separated from the point D and the stem G, and the body A, B, replaced with the like body shown in Fig. 2 in which is inserted an air pipe J, connected at one end with the valve E and the other end arranged to receive the flexible air pipe J' of an air pump with which air may be forced into the tire without danger of its escaping into the body A as the spring F will hold the valve E and the packing *e* firmly around the end of the point D so that no air can escape between them, and the pressing of the point to place in the body A will force the stem J back far enough to insure, first, a perfect seating of the valve E and its packing *e* upon the point D, and, second, it will force the outer end of the stem J far enough away from the cap C so that the pump tube J' may be easily and conveniently connected with or disconnected from the end of the stem.

What we claim as new, and desire to secure by Letters Patent of the United States, is:

1. In combination with the valve stem of an automobile tire, a point securely mounted on the valve stem, packing properly secured upon the stem back of the base of the point.

radiating lugs upon the point, an annular body having lugs in position to engage the lugs on the point a longitudinally movable valve and packing in the body in position to engage the end of the point; and a spring in the body in position to force the valve toward the point.

2. In combination with the wheel rim and valve stem of an automobile wheel, a point screwed upon the valve stem and having radiating lugs projecting from its surface, a packing between the point and the wheel rim, a valve body arranged to receive the packing and form an air tight joint between the rim and the body of the valve, lugs projecting inward from the inner walls of the body in position to engage with the lugs on the point, stops and catches in position to stop the lugs and hold them in proper contact, a valve within the body, packing in said valve in position to engage the end of the point, and a spring in position in the body to force the valve and packing against the end of the point.

3. In combination with the rim and valve stem of an automobile wheel, an annular body having inwardly projecting lugs, a point secured to the valve stem and having radiating lugs in position to engage the lugs in the body, packing upon the valve stem back of the point and in position to engage and close the back end of the body, a valve within the body in position to engage the end of the point, a cap upon the end of the body, an air tube secured in the valve and passing out through the cap, and a spring for forcing the valve against the end of the point.

JAMES P. HAIG.
ALVIN H. PORTER.

Signed in presence of—
ITHIEL J. CILLEY,
A. ALLGIER.